(12) United States Patent
Logvinov et al.

(10) Patent No.: US 7,193,506 B2
(45) Date of Patent: Mar. 20, 2007

(54) METHOD AND SYSTEM FOR MAXIMIZING DATA THROUGHPUT RATE IN A POWER LINE COMMUNICATIONS SYSTEM BY MODIFYING PAYLOAD SYMBOL LENGTH

(75) Inventors: Oleg Logvinov, East Brunswick, NJ (US); Dirk Walvis, Santa Cruz, CA (US); Brion Ebert, Easton, PA (US); David Lawrence, Newton, NJ (US)

(73) Assignee: Arkados, Inc., Piscataway, NJ (US)

( * ) Notice: Subject to any disclaimer, the term of this patent is extended or adjusted under 35 U.S.C. 154(b) by 361 days.

(21) Appl. No.: 10/643,316

(22) Filed: Aug. 19, 2003

(65) Prior Publication Data

US 2005/0169363 A1 Aug. 4, 2005

Related U.S. Application Data

(60) Provisional application No. 60/404,360, filed on Aug. 19, 2002.

(51) Int. Cl.
*G05B 11/01* (2006.01)
(52) U.S. Cl. ............... 340/310.11; 340/310.16; 340/310.15; 375/258
(58) Field of Classification Search .......... 340/310.11, 340/310.13, 310.16, 538.15, 538.16, 538.12; 375/258, 219, 220, 260; 370/235, 480
See application file for complete search history.

(56) References Cited

U.S. PATENT DOCUMENTS

| | | | |
|---|---|---|---|
| 4,715,045 A | 12/1987 | Lewis et al. | |
| 5,490,168 A | 2/1996 | Phillips et al. | |
| 6,459,692 B1 | 10/2002 | Ben-Michael et al. | |
| 6,854,059 B2 * | 2/2005 | Gardner | 713/171 |
| 2003/0090368 A1 * | 5/2003 | Ide et al. | 340/310.06 |
| 2003/0133473 A1 * | 7/2003 | Manis et al. | 370/480 |

\* cited by examiner

*Primary Examiner*—Toan N. Pham
(74) *Attorney, Agent, or Firm*—Mintz, Levin, Cohn, Ferris, Glovsky and Popeo, PC

(57) ABSTRACT

Data throughput rate in a power line communications ("PLC") system is controlled by generating PLC carrier signals in accordance with a PLC signal frame structure containing payload symbols where the payload symbol length is selected based on at least one of a PLC system channel quality and node configuration data. The selected payload symbol length determines the processing operations that a source PLC transceiver performs for generating PLC signals or that a destination PLC transceiver performs for extracting information content from received PLC signals. The payload symbol lengths can be selected to maximize the data throughput rate while maintaining compatibility with prior art PLC system protocols and standards that require a PLC signal frame structure and its payload portion to have fixed, predetermined lengths.

40 Claims, 5 Drawing Sheets

METHOD AND SYSTEM FOR MAXIMIZING DATA THROUGHPUT RATE IN A POWER LINE COMMUNICATIONS SYSTEM BY MODIFYING PAYLOAD SYMBOL LENGTH

CROSS REFERENCE TO RELATED APPLICATION

This application claims the benefit of U.S. Provisional Application No. 60/404,360 filed Aug. 19, 2002, which is incorporated by reference herein.

FIELD OF THE INVENTION

This invention relates to the field of communications over conventional electric power conveying media, and more particularly, to improving data throughput rate in a power line communications ("PLC") system by modifying the length of payload symbols included in a PLC signal frame structure in view of PLC system channel quality information.

BACKGROUND OF THE INVENTION

In a PLC system, information is conveyed over conventional power line media on PLC data carrier signals. The PLC system includes PLC transceivers that operate in accordance with predetermined PLC protocols and standards. The protocols and standards are formulated in view of the processing capabilities of the PLC transceiver equipment and the expected PLC signal transmission characteristics of the PLC system. The protocols and standards, for example, define the spectrum of frequencies used for PLC signal transmissions and how information content and associated control data are carried on PLC signals. The arrangement of information content and overhead data within a PLC signal is typically referred to as a frame structure. The frame structure establishes the sequence that PLC signals containing overhead and information content data are generated for transmission over the PLC system.

When many of the prior art PLC systems, such as orthogonal frequency division multiplexing ("OFDM") PLC systems, were designed, the lack or limited availability of high speed processing technology dictated the characteristics of the PLC signal frame structure. The current and widely used PLC signal frame structure, which is substantially the same as the frame structure adopted in early prior art PLC systems, includes a payload portion interposed between start and end delimiters. See Gardner, S. et al., "*HomePlug Standard Bring Networking to the Home*"http://www.commsdesign.com/main/2001/12/0012feat5.htm, Dec. 12, 2000, incorporated by reference herein. The start and end delimiters include communications overhead data, such as a preamble, destination address, source address, network protocol type and frame check (error correction), which a destination PLC transceiver requires for extracting information content and other control data from the PLC signals transmitted by a source PLC transceiver. The payload portion contains a plurality of payload symbols. Each of the payload symbols represents one or more information content data modulated PLC carriers which are to be generated at and transmitted from the PLC transceiver.

Based on the prior art PLC system design, each of the payload symbols has a fixed, predetermined length determined by the fixed, predetermined length of the payload portion and a portion of the fixed length of each of the payload symbols is allocated to a cyclic prefix. See Gardner.

The cyclic prefix is essentially a replication of the last few microseconds of the payload symbol. As well known in the art, the cyclic prefix length is included in the payload symbol to avoid the adverse effects of intersymbol interference, which may occur because network segments in the PLC system can cause different PLC carriers to experience different respective transmission delays. If the cyclic prefix is not included in a payload symbol, some of the data samples obtained when converting the received time domain PLC carrier waveforms generated for a subject payload symbol to frequency domain data could represent energy associated with PLC carriers generated for a payload symbol that precedes or follows the subject payload symbol in a frame structure. Thus, in PLC system design, the length of the cyclic prefix in a payload symbol usually is set equal to the expected worst case delay variation across the PLC frequency spectrum for the PLC system. This cyclic prefix length ensures that conversion of the PLC carrier waveform into frequency domain data begins at the portion of the PLC carrier waveform following the end of the cyclic prefix, thereby providing that the frequency domain data obtained based on the received PLC carrier waveforms generated for the subject payload symbol is not degraded by any of the PLC carriers generated for the payload symbols preceding or following the subject payload symbol.

It is further noted that the prior art fixed length payload symbol requirement provides that, for each payload symbol, time domain PLC signals having only predetermined carrier frequencies can be generated. The predetermined carrier frequencies for the PLC signals are within a predetermined PLC frequency spectrum and, in addition, only selected modulation methods can be applied for modulating data onto the PLC carrier signals. See, for example, U.S. Pat. No. 6,523,256, incorporated by reference, for a description of modulation methods that can be used in connection with PLC carriers generated for payload symbols. Also according to the prior art PLC system design, a single modulation method must be used in connection with each of the PLC carriers generated for a payload symbol. As is well known in the art, the modulation method, which establishes predetermined orders of modulation that can be used to modulate PLC carriers, determines the amount of data that a PLC carrier can carry.

Although the prior art PLC signal frame structure design limits the maximum available data throughput rate in a PLC system, this result was tolerated or required in view of the limitations of the data and signal processing technologies available in the prior art and to ensure reliable and accurate transfer of information content using PLC signals.

Since the development of the prior art PLC frame structure design, which continues to be used in a vast majority of current PLC systems, advanced, higher speed signal and data processing technologies have become available and cost effective for use in PLC transceiver equipment. PLC systems and PLC equipment, however, continue to utilize the prior art PLC signal frame structure design, which in many circumstances unnecessarily limits the maximum available data throughput rate for the PLC system.

Therefore, a need exists for a system and method for maximizing data throughput rate in a PLC system in view of available higher speed data processing technologies and while also permitting that existing PLC transceiver equipment can continue to be used without difficult or costly modifications.

SUMMARY OF THE INVENTION

In accordance with the present invention, the data throughput rate associated with PLC signal transmission in a PLC system is maximized by selectively controlling the length of payload symbols included in a PLC signal frame structure from which PLC data signal carriers are generated. The selected payload symbol length is computed based on PLC system signal transmission performance channel quality data obtained in real time, based on non-real time processing configuration data ("node configuration data") obtained from PLC signals transmitted over the PLC system to, or pre-programmed at, PLC transceiver equipment or based on a combination of the channel quality data and the node configuration data.

In a preferred embodiment of the present invention, payload symbol length is modified while providing that PLC signal processing otherwise follows prior art PLC frame structure ("legacy") design requirements, i.e., each of the frame structure and the payload portion of the frame structure has a fixed, predetermined length that cannot be changed. When the PLC signal transmission characteristics ("channel quality") for the PLC system is at a sufficiently high level, a length is selected for a payload symbol that exceeds the fixed payload symbol length of the legacy design. By increasing the length of the payload symbols in the payload portion, while maintaining the payload portion at the fixed legacy length, the sum of the lengths of cyclic prefixes, which are included within the respective payload symbols and occupy portions of the symbol lengths, in the frame structure is reduced. Each of the increased length payload symbols provides that a PLC transceiver generates and transmits a greater number of PLC carrier signals containing information content, during the time interval of the frame structure corresponding to the increased length symbol, than that which would be generated and transmitted based on a legacy payload symbol having a shorter length. In other words, the increased length payload symbols in the payload portion provide that more data can be transmitted in a PLC signal transmission than that transmitted for a legacy PLC signal transmission for the time interval corresponding to the length of the PLC signal frame structure, thereby increasing the data throughput rate for the PLC system.

In a preferred embodiment of the present invention, a PLC transceiver within a PLC system generates a PLC signal frame structure including payload symbols each having a same selected length, where the payload symbol length is selected for maximizing the data throughput rate in the PLC system in view of PLC system channel quality data and the node configuration data. The PLC transceiver itself computes channel quality, or receives node configuration data on PLC signals transmitted from another PLC transceiver source. The PLC transceiver processes the channel quality or the node configuration data, or both of the channel quality and node configuration data, to determine the longest possible payload symbol length likely to ensure accurate reproduction of information content at a destination PLC transceiver based on transmission of a PLC signal, which is generated based on the selected payload symbol length, over the PLC system.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF THE INVENTION

The present invention of selectively controlling the length of a payload symbol of a PLC signal frame structure is explained in connection with operations performed at a PLC transceiver of an OFDM PLC system which is designed for conveying PLC data signals over conventional utility electrical power media. It is to be understood, however, that the present invention can be applied to OFDM based or other communication systems operating on other types of wired or wireless media.

Figure 1:
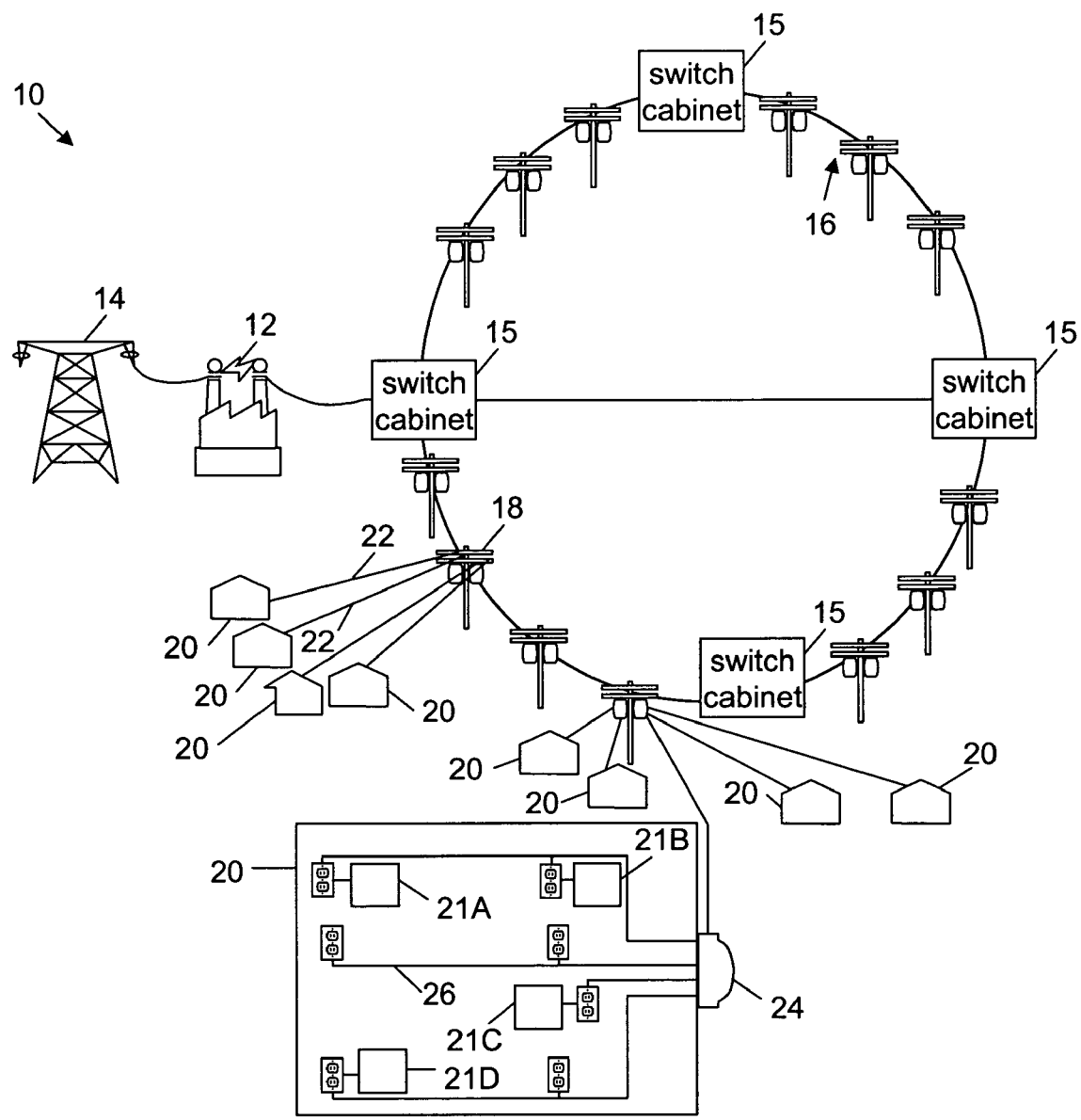
FIG. 1 is an exemplary power line distribution system for high speed data communications.

FIG. 1 illustrates an exemplary, prior art electric power distribution and high speed data communications system 10, which includes both utility electric power distribution and in premise power distribution capabilities and over which PLC data signals generated in accordance with the present invention can be conveyed. Referring to FIG. 1, the system 10 includes a standard medium power substation 12 coupling a high voltage power line 14 to a common medium voltage power line and data distribution access network 16 via a switch cabinet 15. The network 16 is typically configured in a loop, several miles in length, and positioned in proximity to low voltage access points 20A–20H, which can be homes, businesses or other entities. Step down transformers 18 couple the network 16 to low voltage access lines 22, which are at 110–240 V AC and extend to the respective low voltage access points 20. It is to be understood that the network 16 can include power and communications data distribution elements located above as well as below ground. Thus, the network 16 forms a wide area data network ("WAN") for data communications and supplies electricity to the low voltage access points 20. Electric power meters 24 couple respective ends of the low voltage lines 22 to conventional in-home or in-building electricity distribution networks 26, which are contained within the low voltage access points 20. As well known in the art, electronic appliances 21 include PLC transceivers (not shown) having PLC data signal processing capabilities and which can be connected to one another to form a local access network ("LAN") for data communications within a home, business or other environment, are coupled to the network 26 within an access point 20. Also as well known in the art, PLC data signals can be used to transmit high speed data across all segments of the network 10.

In accordance with the present invention, a PLC transceiver selectively controls the length of the payload symbols in a PLC frame structure from which PLC signals are generated, based on the results of an evaluation of PLC system channel quality data, processing configuration data ("node configuration data") obtained from PLC signals transmitted over the PLC system to, or pre-programmed at, the PLC transceiver, or a combination of the channel quality data and the node configuration data, to maximize the data throughput rate and, therefore, increase the efficiency of utilization of the PLC system as a channel for transferring communications data. Referring to FIG. 1, the inventive PLC transceiver can be installed in all segments of the PLC system 10 where a higher data throughput rate is desired. For example, each of a first electronic appliance 21 coupled to the network 26 within a first access point 20 and a second electronic appliance 21 coupled to the electric distribution network (not shown) within a second access point 20 can contain the inventive PLC transceiver for maximizing the data throughput rate for PLC signal transmission between the first and second access points 20. Also for example, in the PLC system 10, each of the electronic appliances 21A and electronic appliance 21D is coupled at a different point to the network 26 within the access point 20A and can contain the inventive PLC transceiver for maximizing the data throughput rate for PLC signal transmission between the two coupled points of the network 26.

Figure 2:
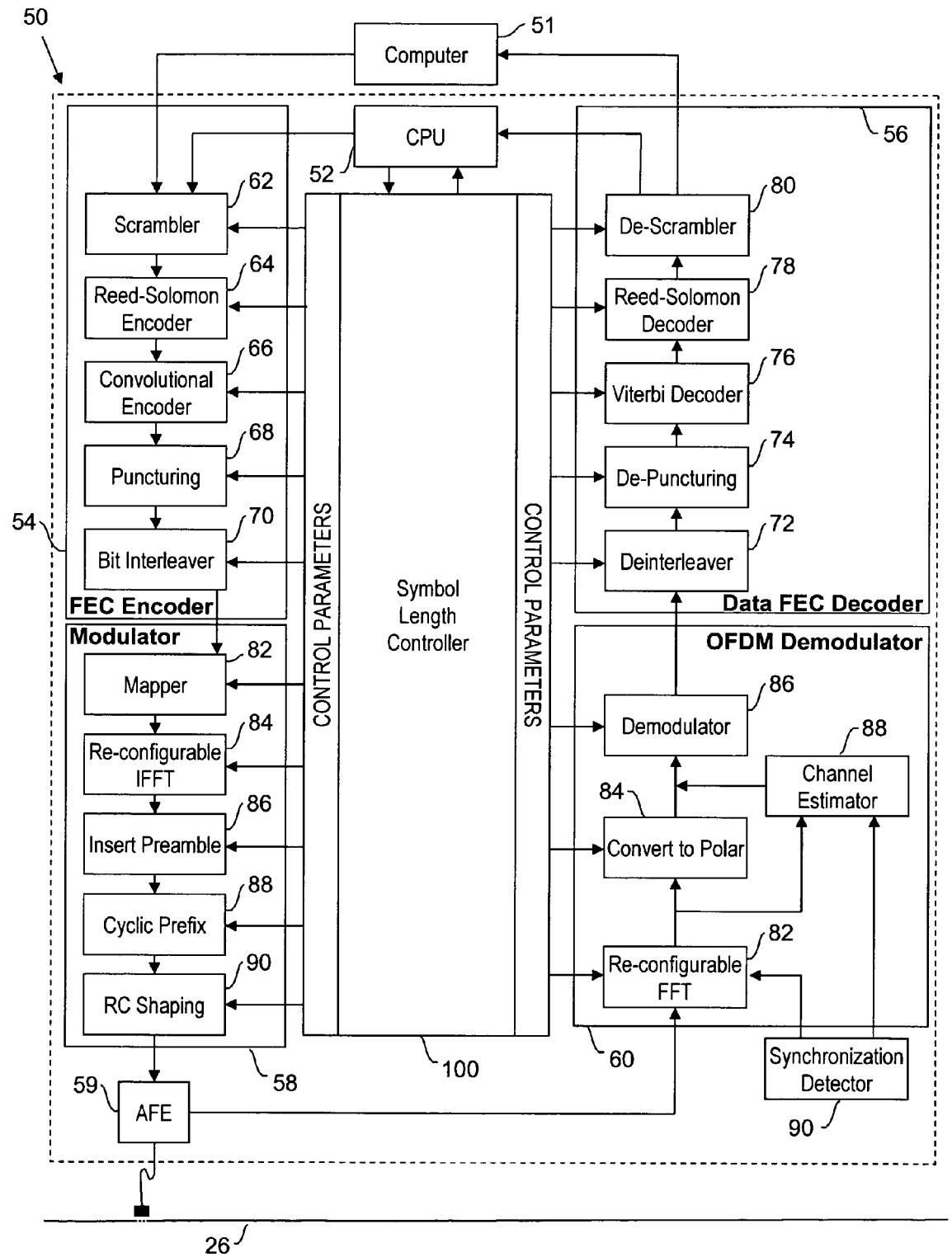
FIG. 2 is a block diagram of a preferred OFDM PLC transceiver in accordance with the present invention.

FIG. 2 is a preferred embodiment of an OFDM PLC transceiver 50 that establishes the physical connection and electronic signal link between the power line network 26 in an access point 20 and a data input/output ("I/O") device, such as a computer 51, as well known in the art, and furthermore selectively controls the length of payload symbols included in a PLC signal frame structure in accordance with the present invention. The inventive PLC transceiver 50 is described below as containing modules, which perform PLC signal processing using techniques well known in the prior art, and which are modified in accordance with the present invention to perform PLC signal processing where a PLC signal frame structure from which PLC signals are generated has a selected and controllable payload symbol length. See, for example, U.S. patent application Ser. No. 10/211,033, filed Aug. 2, 2002 and Ser. No. 10/309,567, filed Dec. 4, 2002, each of which is assigned to the assignee of this application and incorporated by reference herein, for a description of conventional PLC transceiver construction and operation. It is to be understood that the modules of the PLC transceiver 50 described below as performing data or signal processing operations constitute a software module, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules.

Referring to FIG. 2, the PLC transceiver 50 includes a central processor unit ("CPU") 52 coupled to a data forward error correction ("FEC") encoder 54 and a data FEC decoder 56. An OFDM modulator 58 couples the encoder 54 to an analog front end ("AFE") 59, and an OFDM demodulator 60 couples the AFE 59 to the decoder 56. The encoder 54 includes a scrambler module 62, a Reed-Solomon encoder module 64, a convolution encoder module 68 and a bit interleaver module 70 connected to one another in the recited sequence. The decoder 56 includes a de-interleaver module 72, a de-puncture module 74, a viterbi decoder module 76, a Reed Solomon decoder module 78 and a de-scrambler module 80 connected to one another in the recited sequence. The modulator 58 includes a mapper module 82, a reconfigurable inverse fast fourier ("IFFT") processor module 84, a preamble module 86, a cyclic prefix module 88 and an RC shaping module 90 connected to one another in the recited sequence. The demodulator 60 includes a reconfigurable FFT processor module 82, a polar converter module 84 and a demodulator module 86 connected to one another in the recited sequence. In addition, a channel estimator 88 is coupled to the outputs of the polar converter module 84 and the FFT module 82, respectively, and a synchronization detector 91. The detector 91 also is coupled to the FFT module 82.

The modules 59, 62, 64, 66, 68, 70, 72, 74, 76, 78, 80, 82, 84, 86, 88, 90 and 91 are well known prior art PLC transceiver components that can perform prior art PLC signal processing operations which are also well known in the art. It is important to note that, in the prior art, all of the modules in the encoder 54 and the modulator 58 cannot be reprogrammed to process PLC signals based on different, selected payload symbol lengths. In other words, the encoder 54 and modulator 58 only can perform PLC signal processing operations in accordance with fixed payload symbol length parameters, such that, for example, the mapper module 82 and the IFFT module 84 cannot generate, for each payload symbol, different numbers of distinct PLC carriers for carrying information content. Similarly, all of the modules in the decoder 56 and the modules 82, 84 and 86 in the demodulator 60 also cannot be reprogrammed to process received PLC signals based on different, selected payload symbol lengths.

In accordance with the present invention, the PLC transceiver 50 further includes a symbol length controller ("SLC") module 100 which is coupled to the CPU 52 and to each of modules contained in the encoder 54, the decoder 56 and the modulator 58 and to the modules 82, 84 and 86 of the demodulator 60. Furthermore, each of the modules in the encoder 54, the modulator 58 and the decoder 56, and the modules 82, 84 and 86 of the demodulator 60 is reprogrammable and modifies its processing operations based on control parameter signals, which are associated with a payload symbol of a selected length and are supplied from the SLC module 100 of the inventive PLC transceiver 50. As discussed in further detail below, the SLC module 100 generates and transmits to the modules in the encoder 54 and the modulator 58 control parameter signals, which are generated based on the payload symbol length selected for generating PLC signals. The control signals modify the processing operations that the modules perform for generating PLC signals based on a PLC signal frame structure having payload symbols whose length is selected in accordance with the present invention. Further, the SLC module 100 generates and transmits to the modules 82, 84 and 86 in the demodulator 60 and to each of the modules in the decoder 56 control parameter signals, which are generated based on the selected payload symbol length associated with received PLC signals. The control signals modify the processing operations performed for processing received PLC signals, such that information content data bits are extracted from the received PLC signals in accordance with the length selected for the payload symbols of the PLC signal frame structure from which the received PLC signals were generated.

Figure 3:
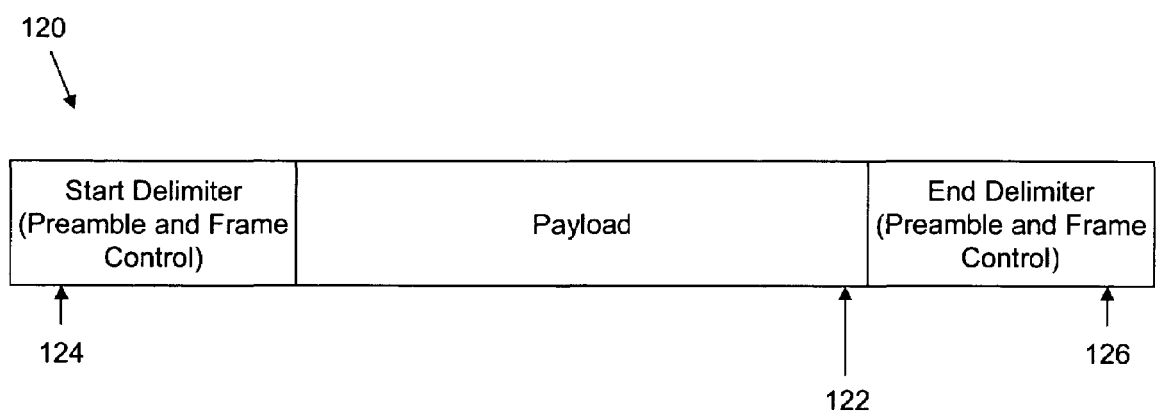
FIG. 3 is an illustration of an exemplary prior art PLC signal frame structure.

For purpose of highlighting the inventive features, it is assumed that each of the modules in the encoder 54, the modulator 58, the decoder 56 and of the demodulator 60 normally operates in a default legacy PLC mode. In the legacy mode, PLC signal processing operations are performed in accordance with a legacy PLC signal frame structure design, which requires a fixed, predetermined length frame structure, a fixed, predetermined length payload portion and that the payload symbols contained in the payload portion have a same fixed, predetermined length. The control signals supplied by the SLC module 100 modify the processing operations performed at (i) the encoder 54 and modulator 58 to provide that a PLC signal frame structure having the payload symbol length identified in the control signal is generated, and (ii) the demodulator 60 and decoder 56 to provide that a received PLC signal is processed in accordance with a PLC signal frame structure having the payload symbol length identified in the control signals. For ease of reference, the present invention is described in connection with an exemplary prior art PLC signal frame structure 120 shown in FIG. 3. Referring to FIG. 3, the frame structure 120 includes a payload portion 122, which primarily contains information content, interposed between a start delimiter 124 and an end delimiter 126, both of which contain overhead data.

In a preferred embodiment, the SLC module 100 selects a payload symbol length and generates and transmits to the encoder 54 and the modulator 58 control signals which provide that the overall length of the payload portion of a PLC signal frame structure generated based on the selected payload symbol length is the same as the length of the legacy PLC payload portion.

The operation of the PLC transceiver 50 is illustrated below with reference to the transmission of PLC signals from a source PLC transceiver 50A (not shown), which is contained in the electronic appliance 21A that is coupled to the network 26 in the access point 20A, to a destination PLC transceiver 50D, which is contained in the electronic appliance 21D that is coupled to a different point of the network 26 in the access point 20A than the transceiver 50A, in the PLC system 10 as shown in FIG. 1. For ease of reference, the modules within the respective transceivers 50A and 50D are referred to below using corresponding alphabetical suffixes, e.g., the transceiver 50A includes the SLC module 100A.

Figure 4:
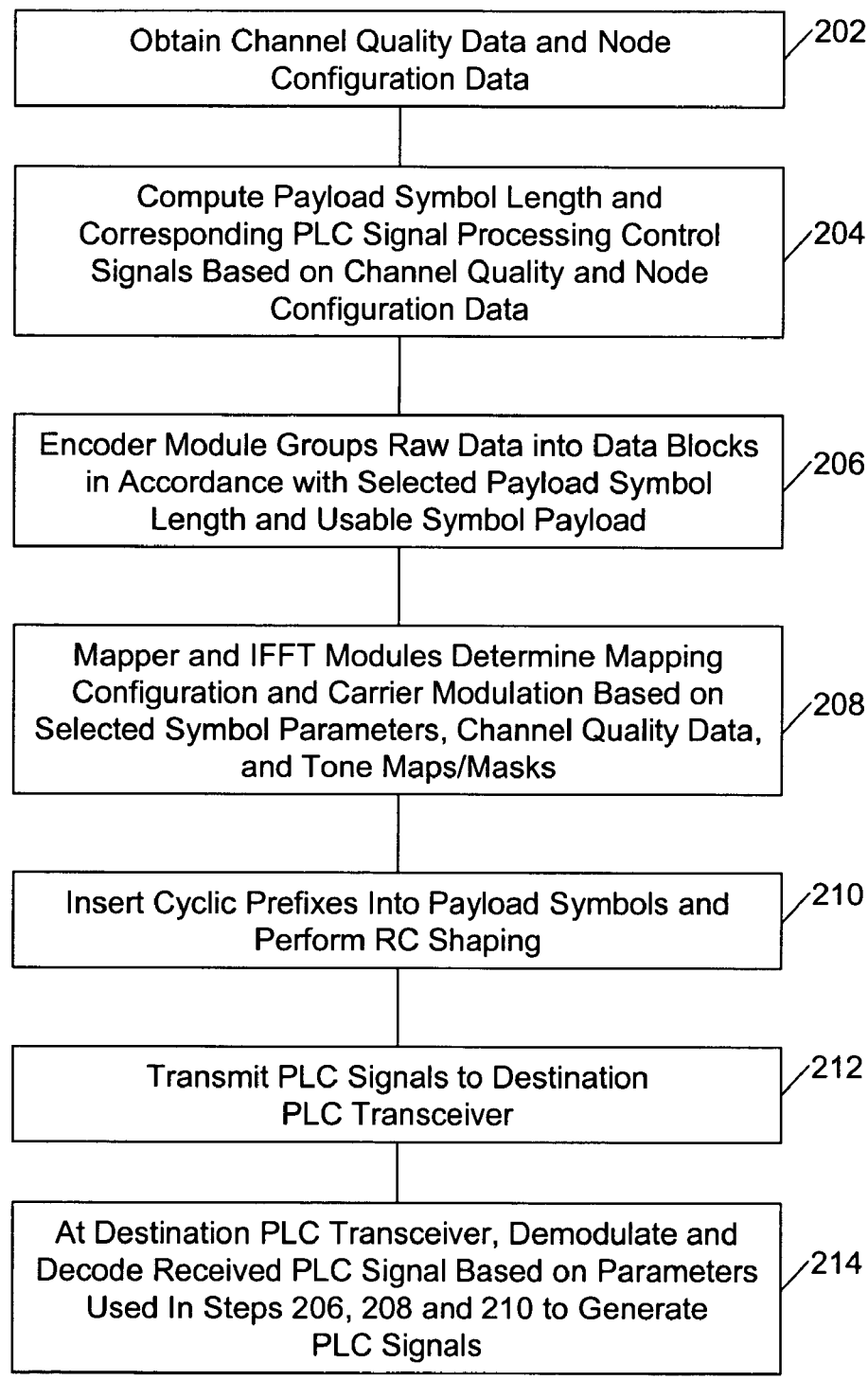
FIG. 4 is a high level flow diagram of a process for maximizing data throughput rate by selecting a payload symbol length in accordance with the present invention.

FIG. 4 shows an exemplary preferred process 200 that the source and destination PLC transceivers 50A, 50D perform for generating PLC signals based on a PLC frame structure having a payload symbol length selected based on channel quality data and node configuration data. Based on the channel quality data and the node configuration data, the SLC module 100A preferably selects a length for the payload symbols that maximizes the data throughput rate and also conforms to legacy requirements concerning the maximum length of the payload portion of the PLC frame structure.

Referring to FIG. 4, in step 202, the source PLC transceiver 50A, which desires to transmit information content to the destination PLC transceiver 50D, initially generates PLC maintenance data signals in the ROBO mode and transmits the maintenance PLC data signals onto the network 26 for receipt by the destination PLC transceiver 50D. The estimator module 88D, using well known prior art techniques, analyzes the PLC signals transmitted by the transceiver 50A to determine channel quality in the segment of the network 26 of the PLC system 10 extending between the transceivers 50A and 50D, and then routes the channel quality data to the CPU 52D. The CPU 52D, in turn, suitably provides that the PLC transceiver 50D transmits the channel quality data on maintenance PLC signals, over the network 26, for receipt at the transceiver 50A. The transceiver 50A, using techniques well known in the art, extracts the channel quality data from the received PLC signal and routes the channel quality data, via the CPU 52A, to the SLC module 100A. In a preferred embodiment, the SLC module 100A further includes node configuration data that was supplied on PLC signals or preprogrammed into the module 100A using suitable, well known techniques in the art. At this point, the SLC module 100A has obtained, using well known prior art techniques, the channel quality and the node configuration data from which to select a length for data payload symbols in a PLC signal frame structure for maximizing data throughput rate between the transceivers 50A and 50D.

In step 204, the SLC module 100A continuously processes the channel quality and the node configuration data to determine a configuration for the payload symbol length that is more efficient, in terms of data throughput rate, than the default legacy payload symbol length for the PLC transceivers 50A and 50D, which has limited throughout rate capability.

Figure 5:
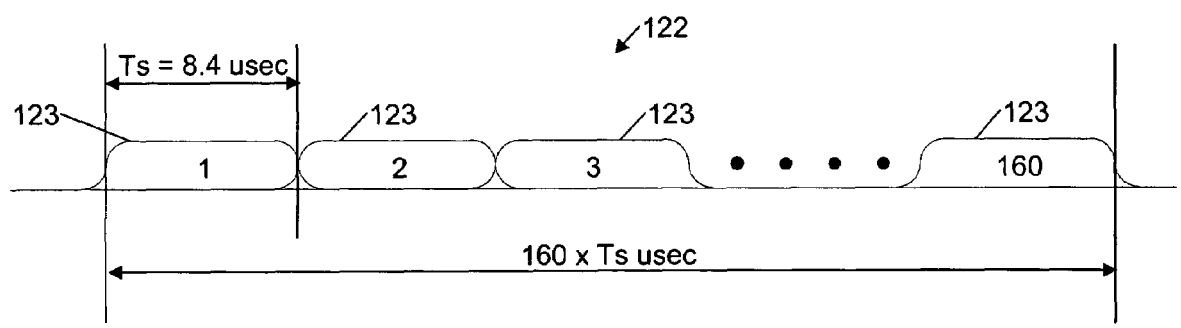
FIG. 5 is an illustration of an arrangement of payload symbols in a payload portion of an exemplary prior art PLC signal frame structure.

FIG. 5 illustrates the features of the payload portion 122 of the legacy frame structure 120 shown in FIG.3. As well known in the art, the length of a payload symbol $Ts$ in a PLC system frame structure is determined as follows:

$$Ts = (NFFT + N\_CP)/\text{Clock rate} \qquad (1)$$

where NFFT is the number of IFFT samples generated by the IFFT module 84A and corresponds to the number of distinct PLC carriers that can be generated for transmission during the payload portion of the PLC signal frame structure, N_CP is the number of data samples corresponding to the length of the cyclic prefix in a payload symbol and Clock rate is the sampling rate of the system clock operating at a PLC transceiver. Referring to FIG. 5, the legacy payload portion 122 includes 160 payload symbols 123 and each payload symbol has the same length. For purposes of illustration, the legacy PLC system design of FIG.5 requires that the IFFT module 84A is pre-programmed to generate only 256 samples, the length of the prefix within each payload symbol is 184 samples and the system clock is at 50 MHz, such that Ts is 8.4 μsec.

If the channel quality data is high, the SLC module 100A computes a length for the payload symbols that is greater than the length of the legacy payload symbol. The increased length of a payload symbol within the fixed length payload portion of the legacy frame structure translates into a predetermined number of available PLC carriers that can be modulated with information content data and generated for transmission, where the predetermined number is greater that the number of PLC carriers that can be generated based on the legacy PLC symbol length. In preferred embodiments, the SLC module 100A provides that more than the legacy number of PLC carriers are generated for a payload symbol as follows.

(1) The SLC module 100 decreases the bandwidth of each of the distinct available PLC carriers, such that a larger number of narrower bandwidth distinct PLC carriers, evenly spaced across the legacy PLC spectrum, can be generated. For example, in the legacy PLC system, 256 distinct PLC carriers are evenly spaced across the legacy PLC spectrum, which for example is between about 2 MHz and about 20 MHz. By narrowing the bandwidth of each of the 256 distinct PLC carriers by, for example, one-half, 512 distinct PLC carriers evenly spaced across the same 18 MHz legacy spectrum can be generated for carrying the increased information content data associated with an increased length payload symbol.

(2) The SLC module 100A provides that distinct PLC carriers are distributed across a PLC frequency spectrum which is a wider than the legacy PLC frequency spectrum. For example, the SLC module 100 increases the available PLC frequency spectrum from between about 2 MHz to about 19 MHz (as in a legacy PLC system) to between about 2 MHz and about 25 MHz. In this expanded PLC frequency spectrum, the SLC module 100A provides that distinct PLC carriers are evenly distributed across the expanded PLC frequency spectrum, where the bandwidth of each of the distinct PLC carriers is (a) the same as in the legacy PLC system or (b) narrower than in the legacy PLC system as described above in (1).

(3) The SLC module 100A resets the system clock to a higher frequency, such as 60 MHz, than the legacy PLC system clock frequency. The increase in the system clock frequency increases the sampling rate, which permits the range of the available PLC frequency spectrum to be increased relative to the legacy PLC system frequency spectrum. Thus, the SLC module 100A provides that more distinct PLC carriers can be generated, similarly as described in (2)(a) or (2)(b), for the longer payload symbol lengths.

Further in step 204, based on the selected increased symbol length, the SLC module 100A accordingly determines a corresponding NFFT, which exceeds the NFFT for the PLC legacy system.

By increasing the payload symbol length while maintaining the legacy payload portion length unchanged, the payload portion includes fewer symbols than in the PLC legacy system. The increased length of a payload symbol, however, does not result in a proportional increase in the length of the cyclic prefix for a payload symbol. The cyclic prefix length for the increased length payload symbol is maintained substantially the same as in the legacy system, because the characteristics of the PLC system are the same and because the high channel quality permits a relatively short cyclic prefix length between consecutive PLC signal transmissions corresponding to consecutive payload symbols. Thus, the cyclic prefix in the increased length payload symbol occupies a smaller fraction of the length of the payload symbol than the length that a cyclic prefix in the shorter, legacy length payload symbol occupies. Consequently, the information content portion of the increased length payload symbols occupies a portion of the PLC frame structure that is greater than the portion of the legacy PLC frame structure occupied by information content contained in the shorter, legacy PLC length payload symbols, thereby increasing the data throughput rate.

Figure 6:
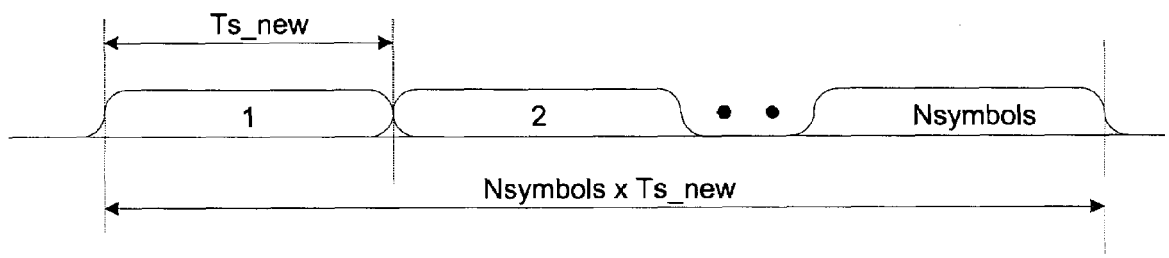
FIG. 6 is an illustration of an arrangement of payload symbols in a payload portion of an exemplary prior art PLC signal frame structure generated in accordance with the present invention.

Referring to FIG. 6, which shows a payload portion of a fixed legacy PLC system length including increased length payload symbols, the SLC module 100A in a preferred embodiment selects an increased payload symbol length corresponding to a NFFT of 2048 samples. Further, the SLC module 100A, by evaluating the channel quality data and also based on the node configuration data, determines that N_CP needs to be 368 samples to provide a sufficiently long cyclic prefix to avoid degradation based on intersymbol interference. Therefore, referring to Equation (1), for a 50 MHz system clock, the length Ts_new of the new increased length payload symbol is 48 μsec and the payload portion includes 28 symbols. The selected length provides that the total payload portion length (28 symbols)(48 μsec/symbol) is the same as the legacy PLC system payload portion length (160 symbols)(8.4 μsec/symbol). It is be understood that the SLC module 100A can suitably select the symbol length to have values corresponding to NFFT equal to 512, 1024, etc. samples.

Referring again to FIG. 4, in step 206 the SLC module 100A transmits control parameter signals associated with the selected symbol length to the modules within the encoder 54A to provide that the encoder 54A groups the raw data into data blocks in accordance with the selected symbol length. In addition, the interleaver module 70A based on the control signals, assigns a greater number of data bits for mapping into a payload symbol, because an increased number of distinct PLC carriers can be generated for the increased length payload symbol.

In step 208, the SLC module 100A transmits control signals, which are generated based on the channel quality data, the node configuration data and known prior art tone maps and masks, to the mapper module 82A and the IFFT module 84A to provide that processing operations are performed in accordance with the selected symbol length. For example, the control signals reprogram the IFFT module 84A to operate in a 2048 sample mode.

In step 210, the SLC module 100A transmits control signals to the preamble module 86A which indicate the length of a cyclic prefix to be inserted in each payload symbol. Further in step 210, the SLC module 100A transmits control signals to the RC shaper 90A to adjust filtering operations, as suitable, based on either (i) the expanded PLC frequency spectrum or (ii) the narrowing of the bandwidth of individual PLC carriers within the PLC frequency spectrum, where the PLC frequency spectrum is legacy sized or expanded.

In step 212, the PLC transceiver 50A transmits, over the network 26 for receipt at the transceiver 50D, the PLC signals generated based on the selected payload symbol length within the legacy for the frame structure. It is further noted that the frame structure further includes frame control configuration data in the start delimiter. The configuration data, which includes channel quality data and selected payload symbol length data, is transmitted on PLC signals to the PLC transceiver 50D before the PLC signals containing information content, and corresponding to the payload symbols, are transmitted.

In step 214, the PLC transceiver 50D receives the PLC signals transmitted from the PLC transceiver 50A. The demodulator and decoder modules 60D and 56D, using well known techniques in the art, demodulate and decode the overhead data transmitted in connection with the start and stop delimiter portions of the frame structure to extract the selected symbol length, and the associated frame control, channel quality and node configuration data included therein. The decoder module 56D then routes the payload symbol length and the other associated control data to the CPU 52D, which in turn routes the symbol length and the associated control data to the SLC module 100D. Based on the symbol length and the associated control data, the SLC module 100D generates and transmits to the modules 82, 84 and 86 of the demodulator 60 and to each of the modules of the decoder 56 suitable control parameter signals to provide that demodulation and decoding of the received PLC signals is performed based on the selected payload symbol length. For example, the FFT module 82 is reconfigured to perform a FFT processing at 2048 samples, rather than at the default PLC legacy mode of 256 samples. Processing modifications analogous to those implemented at the mapper and the encoder module in the transceiver 50A are performed at the demodulator module 86D and the modules of the decoder module 56D to provide for proper demodulation and decoding based on the longer length payload symbols.

It is known that some legacy PLC frame structures have a design that precludes the introduction of data indicating a particular symbol length based upon which PLC signal processing should be performed at a destination PLC transceiver. In these circumstances, the source PLC transceiver 50 includes symbol length information in a higher protocol layer, such as the IP layer, associated with a PLC signal transmission. Alternatively, the source PLC transceiver includes symbol length information in a PLC maintenance signal transmission routinely transmitted to the destination PLC transceiver, as well known in the art. The PLC destination transceiver suitably extracts the symbol length information from the maintenance PLC signal.

In a further preferred embodiment, the CPU 52 in the PLC transceiver 50 controls exchanges of maintenance signals with other PLC transceivers in the PLC system and, based on the exchanges, determines whether the other PLC transceivers have the processing capability to select payload symbol length. The CPU 52 generates a table representative of the PLC signal transmission capabilities of the respective PLC transceivers and causes the information contained in the table to be transmitted on maintenance PLC signals over the PLC system for receipt by other PLC transceivers having the capability to process PLC signals based on a select payload symbol length.

In a preferred embodiment, the CPU 52 in a source PLC transceiver transmits to a destination PLC transceiver maintenance PLC signals identifying the length of payload symbols to be included in subsequent PLC signal transmissions from the source PLC transceiver. In a further preferred embodiment, a destination PLC transceiver transmits maintenance signals to the source PLC transceiver acknowledging receipt of the symbol length information provided by the source PLC transceiver and accordingly processes PLC signals received from the source PLC transceiver at the selected payload symbol length.

Although preferred embodiments of the present invention have been described and illustrated, it will be apparent to those skilled in the art that various modifications may be made without departing from the principles of the invention.

What is claimed is:

1. A method for transferring data on power line communications ("PLC") signals over a PLC system, wherein the PLC system operates in accordance with a PLC signal frame structure including a payload portion and wherein the payload portion has a predetermined, fixed length and includes at least one payload symbol, the method comprising:
   obtaining channel quality data for a PLC system signal path extending between a source PLC transceiver and a destination PLC transceiver;
   computing, based on at least one of the channel quality data and node configuration data, a payload symbol length;
   generating a payload portion including at least one payload symbol of the computed length, wherein the length or sum of the lengths of the at least one payload symbol contained in the generated payload portion equals the predetermined length of the payload portion; and
   modifying processing operations at the source PLC transceiver for generating PLC carriers in accordance with the PLC signal frame structure including the at least one payload symbol having the computed payload length.

2. The method of claim 1 further comprising:
   modifying processing operations at the destination PLC transceiver for extracting data from the PLC signal frame structure based on the computed length payload symbol.

3. The method of claim 1, wherein the source PLC transceiver operates in a default mode for generating PLC carriers based on a PLC signal frame structure including payload symbols having a first length, wherein the computed payload symbol length exceeds the first length, thereby increasing PLC data throughput rate and efficiency of utilization of the PLC system as a channel for transferring communications data.

4. The method of claim 3 further comprising: generating a predetermined number of distinct PLC carriers based on the computed payload symbol length, wherein the predetermined number of PLC carriers exceeds an available number of distinct PLC carriers generated during operation of the source PLC transceiver in the default mode.

5. The method of claim 4, wherein the predetermined number of distinct PLC carriers have a narrower bandwidth than the bandwidth of the PLC carriers generated during operation of the source PLC transceiver in the default mode.

6. The method of claim 4, wherein the predetermined number of distinct frequency PLC carriers are distributed across a PLC frequency spectrum broader than a PLC frequency spectrum required by the default mode.

7. The method of claim 6, wherein the predetermined number of distinct PLC carriers has a narrower bandwidth than the bandwidth of the PLC carriers generated during operation of the source PLC transceiver in the default mode.

8. The method of claim 3 further comprising:
   increasing a sampling rate of a clock included in the source PLC transceiver to a rate exceeding a sampling rate associated with the default mode.

9. The method of claim 8, wherein the predetermined number of distinct PLC carriers has a narrower bandwidth than the bandwidth of the PLC carriers generated during operation of the source PLC transceiver in the default mode.

10. The method of claim 1, wherein the destination PLC transceiver operates in a default mode for extracting information content from a received PLC signal generated based on a PLC frame structure including payload symbols having a first length, wherein the computed payload symbol length exceeds the first length.

11. The method of claim 1 further comprising:
   transmitting from the PLC source transceiver, over the PLC system and for receipt at the destination PLC transceiver, PLC carriers generated in accordance with the frame structure;
   determining at the destination PLC transceiver, from the PLC carriers transmitted from the source PLC transceiver, whether the payload symbols used to generate the received PLC carriers have a length other than a default mode payload symbol length; and
   at the destination PLC transceiver, extracting information content data from the received PLC carriers based on the payload length determination.

12. The method of claim 1, wherein the source PLC transceiver operates in a default mode for generating PLC carriers based on a PLC signal frame structure including payload symbols having a first length, wherein the computed payload symbol length is less than the first length.

13. The method of claim 1, wherein the PLC system includes power and communications data distribution components operating in accordance with at least one operating mode.

14. The method of claim 1, wherein the at least one operating mode includes PLC system operation in accordance with processing capabilities at a range of processing speeds.

15. The method of claim 1, wherein the PLC carriers have frequencies within a PLC frequency spectrum extending between about 2 MHz and about 30 MHz.

16. A power line communications ("PLC") transceiver for transferring, over a PLC system, PLC signals generated in accordance with a PLC signal frame structure including a payload portion, wherein the payload portion has a predetermined, fixed length and includes at least one payload symbol, the PLC transceiver comprising:
- a channel estimator for obtaining channel quality data for a PLC system signal path extending to a destination PLC transceiver;
- a symbol length controller coupled to the channel estimator and for computing, based on at least one of the channel quality data and node configuration data stored in the symbol length controller, a payload symbol length, wherein the computed payload symbol length is used for generating a payload portion including at least one payload symbol of the computed length, wherein the length or sum of the lengths of the at least one payload symbol contained in the generated payload portion equals the predetermined length of the payload portion; and
- a PLC carrier generator coupled to the symbol length controller for generating PLC carriers containing information content, wherein the symbol length controller supplies the PLC signal generator with control signals for modifying processing operations in accordance with a PLC signal frame including the at least one payload symbol having the computed symbol length.

17. The PLC transceiver of claim 16, wherein the PLC carrier generator normally operates in a default mode, wherein in the default mode a payload symbol has a predetermined length.

18. The PLC transceiver of claim 17, wherein the computed payload symbol length exceeds or is less than the predetermined payload symbol length for the default mode.

19. The PLC transceiver of claim 16, wherein the PLC carrier generator further comprises a reprogrammable forward error correction ("FEC") encoder and a reprogrammable FEC decoder capable of being programmed to perform PLC processing on data blocks containing information content data in accordance with a selected payload symbol length, wherein the data blocks are selected from at least one of a predetermined number of sizes.

20. The PLC transceiver of claim 16, wherein the PLC carrier generator further comprises a reprogrammable interleaver module and a reprogrammable deinterleaver module which are coupled respectively to the FEC encoder and FED decoder, wherein each of the interleaver and deinterleaver modules is capable of being programmed to perform PLC signal processing on data blocks containing information content data in accordance with a selected payload symbol length.

21. The PLC transceiver of claim 16 further comprising:
- a computer processing unit ("CPU") coupled to the symbol length controller and the PLC carrier generator, wherein the CPU controls Phy layer software operations and performs channel quality assessment operations.

22. A method for transferring data on power line communications ("PLC") signals over a PLC system, wherein the PLC system is capable of operating in accordance with both a first PLC signal frame structure and a second PLC signal frame structure, each of said first and second PLC signal frame structures including a payload portion having at least one payload symbol, the method comprising:
- obtaining channel quality data for a PLC system signal path extending between a source PLC transceiver and a destination PLC transceiver;
- computing, based on at least one of the channel quality data and node configuration data, a payload symbol length;
- generating a payload portion including at least one payload symbol of the computed length, wherein the length or sum of the lengths of the at least one payload symbol contained in the generated payload portion conforms to the maximum allowable length of the payload portion of the first PLC signal frame structure and wherein said generating of the payload portion further comprises modifying processing operations at the source PLC transceiver for generating the payload portion in accordance with the second PLC signal frame structure including the at least one payload symbol having the computed payload symbol length.

23. The method of claim 22 further comprising: modifying processing operations at the destination PLC transceiver for extracting data from the PLC signal frame structure based on the computed length payload symbol.

24. The method of claim 22, wherein computing a payload symbol length comprises determining a length of a cyclic prefix of the payload symbol.

25. The method of claim 22, wherein computing a payload symbol length comprises determining a length of a data portion of the payload symbol.

26. The method of claim 22, wherein computing a payload symbol length comprises computing the payload symbol length based on the channel quality data.

27. The method of claim 22, wherein computing a payload symbol length comprises computing the payload symbol length based on the node configuration data.

28. The method of claim 22, wherein computing a payload symbol length comprises computing the payload symbol length based on the channel quality data and the node configuration data.

29. The method of claim 22, wherein computing a payload symbol length comprises computing a payload symbol length that is greater than a payload symbol length according to the first PLC signal frame structure.

30. The method of claim 22, wherein the length or sum of the lengths of the at least one payload symbol contained in the generated payload portion equals the maximum allowable length of the payload portion of the first PLC signal frame structure.

31. The method of claim 22, further comprising transmitting over the PLC system signal path a signal identifying the computed payload symbol length.

32. In a power line communications ("PLC") system that is capable of operating in accordance with both a first PLC signal frame structure and a second PLC signal frame structure, each of said first and second PLC signal frame structures including a payload portion having at least one payload symbol, a PLC transceiver operating in accordance with the second PLC signal frame structure comprising:
- a channel estimator for obtaining channel quality data for a PLC system signal path extending between the PLC transceiver and another PLC transceiver; and
- a symbol length controller coupled to the channel estimator and for computing, based on at least one of the channel quality data and node configuration data stored in the symbol length controller, a payload symbol length, wherein the computed payload symbol length is used for generating a payload portion including at least one payload symbol of the computed length, wherein the length or sum of the lengths of the at least one payload symbol contained in the generated payload portion conforms to the maximum allowable length of the payload portion of the first PLC frame structure, and wherein the generating further comprises modifying processing operations in accordance with the second PLC signal frame structure including the at least one payload symbol having the computed payload symbol length.

33. The PLC transceiver of claim 32, wherein the payload symbol length comprises a cyclic prefix length.

34. The PLC transceiver of claim 32, wherein the payload symbol length comprises a data portion length.

35. The PLC transceiver of claim 32, wherein the symbol length controller computes the payload symbol length based on the channel quality data.

36. The PLC transceiver of claim 32, wherein the symbol length controller computes the payload symbol length based on the node configuration data.

37. The PLC transceiver of claim 32, wherein the symbol length controller computes the payload symbol length based on the channel quality data and the node configuration data.

38. The PLC transceiver of claim 32, wherein the payload symbol length is greater than a payload symbol length according to the first PLC signal frame structure.

39. The PLC transceiver of claim 32, wherein the length or sum of the lengths of the at least one payload symbol contained in the generated payload portion equals the maximum allowable length of the payload portion of the first PLC signal frame structure.

40. The PLC transceiver of claim 32, further cofigured to transmit over the PLC system signal path a signal identifying the computed payload symbol length.

* * * * *